United States Patent
Kurz et al.

[11] Patent Number: 5,601,925
[45] Date of Patent: Feb. 11, 1997

[54] PENETRATION AGENT

[75] Inventors: Günter Kurz, Tamins; Manfred Wenzler, Domat/Ems, both of Switzerland

[73] Assignee: EMS-Inventa AG, Zurich, Switzerland

[21] Appl. No.: 398,133

[22] Filed: Mar. 3, 1995

[30] Foreign Application Priority Data

Mar. 4, 1994 [DE] Germany ............... 44 07 246.5

[51] Int. Cl.⁶ ............... B05D 3/00; B05D 3/12; B32B 27/38
[52] U.S. Cl. ............... 428/413; 156/330; 156/331.7; 525/528; 427/322
[58] Field of Search ............... 156/330, 331.7; 427/322; 525/528; 428/413

[56] References Cited

U.S. PATENT DOCUMENTS

| | | | |
|---|---|---|---|
| 3,755,165 | 8/1973 | Bhakuni et al. | 156/331.7 X |
| 3,922,468 | 11/1975 | Burke et al. | 156/330 X |
| 4,271,051 | 6/1981 | Eschwey | 554/149 |
| 5,019,602 | 5/1991 | Lowe | 521/127 |

FOREIGN PATENT DOCUMENTS

| | | |
|---|---|---|
| 0052315 | 10/1982 | European Pat. Off. . |
| 0194678 | 5/1990 | European Pat. Off. . |
| 0459287 | 5/1995 | European Pat. Off. . |
| 58-071917 | 4/1983 | Japan . |
| 5032868 | 2/1993 | Japan . |

*Primary Examiner*—Michael Lusignan
*Attorney, Agent, or Firm*—Browdy and Neimark

[57] ABSTRACT

A penetration agent for elastomer reinforcement substrate contains at least one linear aliphatic monoglycide ether having at least 10 carbon atoms. Use of this penetration agent for producing elastomer-compatible reinforcement substrates avoids the use of volatile solvents and the problems associated therewith.

10 Claims, 1 Drawing Sheet

PENETRATION AGENT

FIELD OF INVENTION

The present invention relates to a penetration agent for treating elastomer compatible textile reinforcement substrates, e.g. V-belts, drive belts, conveyor belts, tires, hoses, and more particularly to a composition for enhancing the bonding of reinforcement substrates to rubber and the like.

BACKGROUND

As a rule, because of their inadequate bonding to rubber, textile reinforcement substrates of polyester, polyamide or aramide (e.g. Kevlar™) fibers require pre-treatment with adhesion promoters, the latter of which are applied either when the fibers are manufactured or when the textile is prepared. Especially suitable adhesion promoters are epoxides and isocyanates, as well as blocked isocyanates; isocyanates with a polyfunctional structure are especially preferred. Other suitable adhesion promoters are disclosed in EP-A-0 459287 (corresponding to U.S. Pat. No. 5,229,202) and EP-B-0 194 678 (corresponding to U.S. Pat. No. 5,032,454).

In order to enhance the effectiveness of such adhesion promoters and especially to improve their penetration into the fiber or textile reinforcement substrate, such adhesion promoters are generally used in the form of solutions of organic solvents. However, such organic solvents are hazardous to health and require major efforts and expenditures to prevent air pollution and for recovery and reprocessing. The need therefore exists for solvent-free adhesion promoter systems.

SUMMARY

An object of the present invention is therefore to overcome deficiencies of the prior art, such as those pointed out above; another object is to provide penetration agents which overcome the disadvantages of the aforementioned prior art and in particular replace volatile and hence environmentally polluting organic solvents and aqueous media; and a further object of the invention is to provide improved adhesion promoter compositions.

In accordance with the present invention, a penetration agent for elastomer reinforcement substrates is provided which comprises at least one linear aliphatic monoglycidyl ether having at least 10 carbon atoms, hereinafter sometimes "monoglycide ether". Such a linear aliphatic monocylicide ether is used with a typical adhesion promoter, such as a polyfunctional isocyanate, in place of the previously used organic solvent, to pretreat the textile reinforcement substrate to enhance bonding to rubber and the like.

The above and other objects and the nature and advantages of the present invention will be more apparent from the following detailed description of specific embodiments.

DETAILED DESCRIPTION OF EMBODIMENTS

Figure 1:
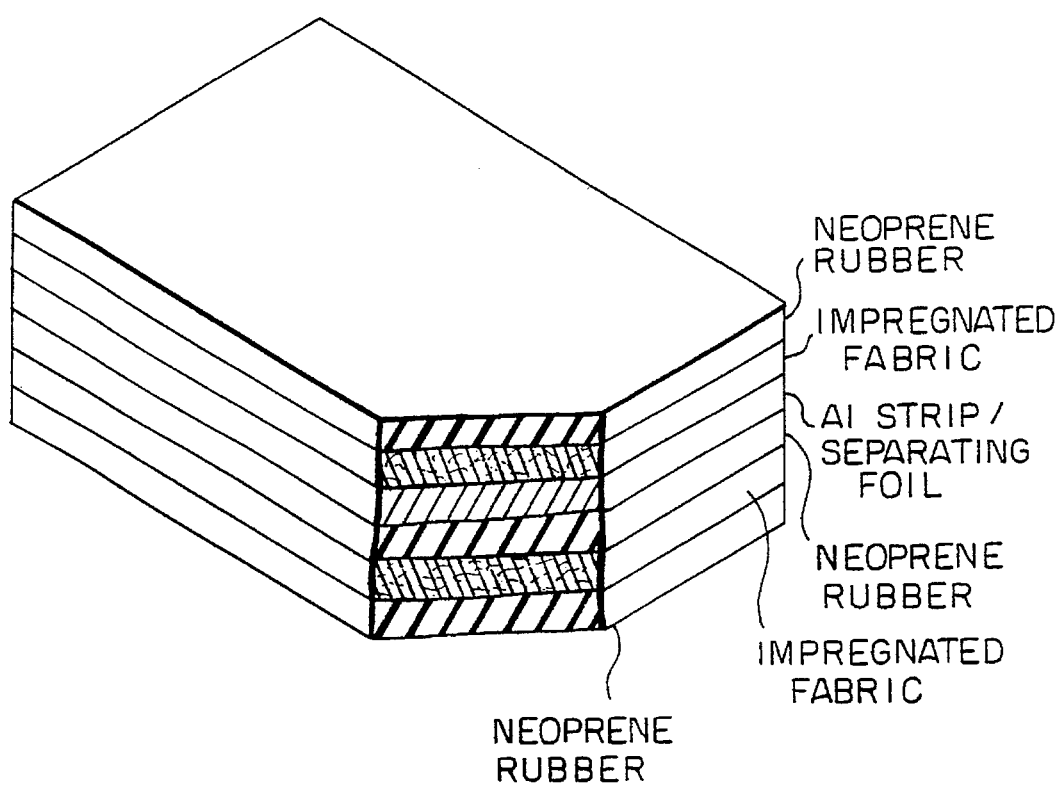
FIG. 1 is a schematic, enlarged view, partly broken away, of a test sample as made in accordance with Example 2.

It has been found that long-chain aliphatic monofunctional glycide ethers having at least 10 carbon atoms exhibit excellent penetrating action in elastomeric reinforcement substrates. Monoglycide ethers with from 12 to 15 carbon atoms, or mixtures thereof, such as Grilonit RV 1814 or Epoxide 8 made by EMS-CHEMIE AG are especially preferred.

The monoglycide ethers are reactive penetration agents that react via the epoxide groups and are incorporated into the adhesion promoter system. Their emulsifying and dissolving capacity for isocyanates, epoxides, elasticizing additives, and pre-adhesivizing additives is very good. They have a very low viscosity of <10 mPa*s at 25° C. and a favorable surface tension, which bring about a very good wetting behavior and excellent penetration on the textile reinforcement substrates.

Suitable adhesion promoters are those used in the prior art, including those mentioned above. Especially preferred cross-linking monomers or polymers useful as adhesion promoters are polyfunctional isocyanate compounds, among which diphenyl methane-4-4'-diisocyanate (PMDI) is quite particularly preferred. Polyfunctional epoxides, alone or in combination with polyfunctional isocyanate compounds, are also preferred.

Preferred reinforcement substrates are polyester films, polyester or aramide fibers, and cord or cord fabrics made of these fibers. Because of their special properties, selected additives other than the adhesion promoters can be applied to the substrate in the pretreatment with the present monoglycide ether compositions.

Preferred additives in the penetration agent according to the invention, other than the adhesion promoters, are accordingly elasticizing polymers, such as reactive and nonreactive latex and rubbers, and cross-linking monomer and/or polymer compounds, such as other polyglycide ethers, polyols and polyester polyols. These other additives may also improve adhesion between the elastomer to be reinforced and the reinforcement fibers or films.

Advantageously, the weight ratios of the adhesion promoter, e.g. isocyanate compound, to the penetration agent are between 90:10 and 10:90. Weight ratios between 30:70 and 50:50 are preferred, especially for the polyester or aramide reinforcement fibers or for polyester films. The special advantages of the polyfunctional isocyanate compounds as adhesion promoters reside in their capabilities of stiffening the substrates by means of cross-linking reactions of the isocyanates before their incorporation into the elastomers to be reinforced by the impregnated reinforcement fibrous or film substrates.

A particular advantage of the present invention resides in the fact that the solutions, emulsions or dispersions of the penetration agent and additives are adequately stable at storage and application temperatures. A further advantage of the penetration agent according to the invention is that because of the markedly improved bonding strengths, less adhesion promoter, e.g. PMDI, is needed for a defined strength level than in the prior art.

The wetting of the reinforcement fibers or films by the adhesion promoting composition or by the reactive penetration agent per se comprises a wetting step, which may be done by immersion, spraying, painting, padding, absorption, or application by roller, and the ensuing freeing of the substrate of excessive penetration agent or adhesion promoting composition, preferably by squeezing it out. The quantity applied, known in the art as "dip pickup", preferably from 3 to 6 weight % based on the weight of the substrate, is then fixed to the substrate by heating at 100°–250° C., preferably 130°–200° C., for 0.1 to 30 minutes.

The application of the various additives, especially the selected adhesion promoter, for elasticizing and cross-linking may naturally be done selectively in sequential steps or jointly, preferably the latter in the form of a single adhesion promoter composition, in a single step.

Then, to further improve the substrate wetting performance, latex preimpregnation may be done, which likewise requires a fixation at temperatures of up to 250° C. Resorcinolformaldehyde-latex mixtures (RFL) are particularly suitable for this purpose in the prior art.

Thus the use of the penetration agent by itself to produce elastomer-compatible reinforcement substrates is also included in the present invention.

The following examples are offered illustratively, and without limitation:

EXAMPLE 1

This example illustrates the wetting capability of preadhesivized polyester fabric (hereinafter called PA-PES) suitable for the production of reinforced rubber articles, when a monoglycide ether (MGE) according to the present invention is used as a penetration agent in a mixture with diphenyl methane-4,4'-diisocyanate (PMDI).

A PA-PES fabric cut to the size of 5.7×30 cm is suspended 1 cm deep by its narrow end into the liquid test specimen, and at 23° C., the height to which the liquid rises on the fabric is measured as a function of time, as shown in the following table.

TABLE 1

| Duration in minutes | Rise in height in mm | | | |
|---|---|---|---|---|
| | PMDI[1] 15% in toluene | PMDI 100% | PMDI 40% in MGE | MGE[2] 100% |
| 2 | 45 | 8 | 20 | 30 |
| 5 | 55 | is | 30 | 40 |
| 15 | 65 | 22 | 50 | 65 |
| 30 | 73 | 37 | 65 | 85 |
| 60 | 80 | 50 | 82 | 110 |
| 120 | 88 | 53 | 105 | 145 |
| | * | | | ** |

Remarks:
[1]PMDI = diphenyl methane 4,4'-diisocynaate
[2]MGE = monoglycide ether
*Toluene evaporates, penetration is stopped
**Penetration continues with nonvolatile penetration agent The comparison clearly shows that a mixture of 40% PMDI, for instance, in the penetration agent MGE according to the invention penetrates more lastingly and therefore furnishes the prerequisite of greater effectiveness. This improved penetration effected by the MGE is made even more clear in the far-right column which shows the rapid and effective penetration of 100% MGE, particularly when 100% PMDI is used for comparison.

EXAMPLE 2

Example 2 shows the attainable bonding level of GRILONIT RV 1814, CAS 68081-84-85, which is a monoglycide ether made by EMS CHEMIE-AG, as a penetration agent MGE in mixtures with decreasing quantities of Desmodur VK, CAS 9016-87-9 made by Bayer AG, as the PMDI component. For the sake of direct comparison with the solvent-containing PMDI impregnation as a starting situation and to preclude unknown application factors that affect the quality, the comparative compositions applied in this example all contained solvent.

The preadhesivized PES fabric used for this purpose is first dripped for 30 seconds into the solvent-containing PMDI or MGE and PMDI solution as per Table 2 below, and then ventilated for 10 minutes at room temperature. The test fabric is then dried at 130° C. for 12 minutes in an ambient air drying cabinet.

An RFL (resorcinol-formaldehyde-latex) solution is prepared as follows: 0.5 parts by weight (hereinafter PW) of 100% sodium hydroxide are dissolved in 90.5 PW deionized water at room temperature. After the addition of 4.4 PW of 100% resorcinol and 4.6 PW of 37% aqueous formaldehyde solution, light stirring is done at room temperature for 2.5 h. Then while stirring, 48.3 PW of this preparation is added to 51.7 PW of an aqueous latex, and the mixture is aged for 8 to 24 h at room temperature with light stirring.

The above-used aqueous latex comprises 37.6 PW latex type 571 (equals Neoprene latex made by DuPont) plus 14.1 PW deionized water. The Neoprene rubber used is available in the form of a calandered unvulcanized rubber sheet approximately 0.7 mm thick.

The test fabric, pretreated as described above, is dipped for 30 seconds into the RFL bath, ventilated for 10 minutes at room temperature, and then this procedure is repeated two more times. After that, drying and prereaction are carried at 130° C. for 30 minutes. The thus-treated fabric is now stiff and is suitable for cutting to size and use for testing. Such a test body is illustrated in FIG. 1 and is suitably of a size of 2×4"; the aluminum strip, used as a separating foil, is 2×0.7.

The bonding level is ascertained by means of the peeling test PEEL (2-ply strip adhesion test) using test bodies that are vulcanized for 30 minutes at 160° C. Results are shown in Table 2.

TABLE 2

| Proportion of PMDI in vehicle liquid, weight % | 100 | 90 | 80 | 60 | 40 | 30 |
|---|---|---|---|---|---|---|
| MGE, PW | — | 1.5 | 3 | 6 | 9 | 10.5 |
| PMDI, PW | 15 | 13.5 | 12 | 9 | 6 | 4.5 |
| Toluene, PW | 85 | 85 | 85 | 85 | 85 | 85 |
| Material on fabric, 100% (dip pickup), weight % | 3.8 | 3.6 | 3.7 | 3.7 | 3.7 | 3.6 |
| Cohesion tearing, % of surface area | 100 | 100 | 100 | 100 | 100 | 100 |
| Mean cohesion strength, N | 192 | 194 | 202 | 201 | 206 | 208 |

All the mixtures of PMDI in the MGE penetration agent exhibit 100% cohesion tearing in the rubber and all exhibit higher mean cohesion strengths than the comparison example with PMIDI alone. With a decreasing proportion of PMDI, there is a tendency to increasing cohesion strengths. This suggests that the MGE penetration agent also contributes to an improvement in the strength of the resultant fabric reinforced elastomer.

EXAMPLE 3

Analogously to Example 2, this example shows the bonding level attainable of Grilonit RV 1814 as a penetration agent in a 60/40 weight % mixture with Desmodur VK as the PMDI component and in an application according to the present invention without solvent.

TABLE 3

| | |
|---|---|
| MGE, PW | 60 |
| PMDI, PW | 40 |
| Material on fabric 100% (dip pickup), weight % | 3.6 |
| Cohesion tearing, % of surface area | 100 |
| Mean cohesion strength, N | 208 |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. An adhesion promoter composition for penetrating and impregnating a reinforcement substrate, consisting essentially of effective adhesion and penetrating amounts of an isocyanate adhesion promoter and at least one non-volatile linear aliphatic monoglycide ether having at least 10 carbon atoms and having a viscosity at 25° C. of less than 10 mPa*s as a penetration-enhancing agent.

2. A composition according to claim 1 wherein said monoglycide ether is selected from the group consisting of glycide ethers having 12–15 carbon atoms, and mixtures thereof.

3. A composition according to claim 1 wherein said penetration-enhancing agent comprises about 10% to about 90% by weight of said composition.

4. A composition according to claim 1 further comprising an additive selected from the group consisting of an elasticizing polymer, a cross-linking monomer or polymer, and a mixture thereof.

5. An adhesion promoter composition according to claim 1, wherein said isocyanate compound is a polyfunctional isocyanate.

6. A composition according to claim 2 wherein said penetration-enhancing agent comprises about 10% to about 90% by weight of said composition.

7. A composition according to claim 6 wherein said isocyanate adhesion promoter is a polyfunctional isocyanate, and wherein said polyfunctional isocyanate in said penetration-enhancing agent is present in a weight ratio of 30:70 to 50:50.

8. A composition according to claim 5 wherein said polyfunctional isocyanate in said penetration-enhancing agent is present in a weight ratio of 30:70 to 50:50.

9. A composition according to claim 5 wherein said polyfunctional isocyanate is diphenyl methane-4,4'-diisocyanate.

10. A product comprising a reinforcement substrate impregnated with a composition according to claim 1 in an amount from 3 to 6 weight % based on the weight of said substrate.

* * * * *